United States Patent
Burton

(10) Patent No.: US 8,232,910 B1
(45) Date of Patent: Jul. 31, 2012

(54) RTAWS ACTIVE TOWER HAZARD DETECTION SYSTEM

(75) Inventor: Mark W. Burton, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 278 days.

(21) Appl. No.: 11/897,844

(22) Filed: Aug. 31, 2007

(51) Int. Cl.
G01S 13/93 (2006.01)
G01S 13/94 (2006.01)

(52) U.S. Cl. ............ 342/29; 342/26 B; 342/65; 701/301

(58) Field of Classification Search .............. 342/29
See application file for complete search history.

(56) References Cited

U.S. PATENT DOCUMENTS

| | | | | |
|---|---|---|---|---|
| 2,503,412 A * | 4/1950 | Purington | .................... | 342/46 |
| 2,613,317 A * | 10/1952 | Mozley | .................... | 327/25 |
| 3,369,231 A * | 2/1968 | Foral | .................... | 342/29 |
| 4,023,408 A * | 5/1977 | Ryan et al. | .................... | 73/170.24 |
| 4,299,483 A * | 11/1981 | Grove et al. | .................... | 356/141.1 |
| 4,348,674 A * | 9/1982 | Muth et al. | .................... | 342/192 |
| 4,894,659 A * | 1/1990 | Andrews | .................... | 342/121 |
| 4,972,195 A * | 11/1990 | Markson et al. | .................... | 342/460 |
| 5,111,400 A * | 5/1992 | Yoder | .................... | 701/3 |
| 5,331,330 A * | 7/1994 | Susnjara | .................... | 342/460 |
| 5,339,085 A * | 8/1994 | Katoh et al. | .................... | 342/180 |
| 5,381,338 A * | 1/1995 | Wysocki et al. | .................... | 701/409 |
| 5,636,123 A * | 6/1997 | Rich et al. | .................... | 701/301 |
| 5,638,282 A * | 6/1997 | Chazelle et al. | .................... | 701/301 |
| 5,771,020 A * | 6/1998 | Markson et al. | .................... | 342/460 |
| 5,831,570 A * | 11/1998 | Ammar et al. | .................... | 342/26 B |
| 5,867,804 A * | 2/1999 | Pilley et al. | .................... | 701/120 |
| 5,892,462 A * | 4/1999 | Tran | .................... | 340/961 |
| 5,936,552 A * | 8/1999 | Wichgers et al. | .................... | 340/963 |
| 5,945,926 A * | 8/1999 | Ammar et al. | .................... | 340/970 |
| 6,064,942 A | 5/2000 | Johnson et al. | | |
| 6,112,141 A * | 8/2000 | Briffe et al. | .................... | 701/14 |
| 6,128,553 A | 10/2000 | Gordon et al. | | |
| 6,150,901 A | 11/2000 | Auken | | |
| 6,154,151 A | 11/2000 | McElreath et al. | | |
| 6,163,021 A | 12/2000 | Mickelson | | |
| 6,166,661 A | 12/2000 | Anderson et al. | | |
| 6,169,770 B1 | 1/2001 | Henely | | |
| 6,178,391 B1 | 1/2001 | Anderson et al. | | |
| 6,194,980 B1 | 2/2001 | Thon | | |
| 6,201,494 B1 | 3/2001 | Kronfeld | | |
| 6,219,594 B1 * | 4/2001 | Nicosia et al. | .................... | 701/16 |

(Continued)

OTHER PUBLICATIONS

"Obstacle Alerting," Honeywell Enhanced Ground Proximity Warning System, http://www.egpws.com, printed Nov. 27, 2007, 1 page.

(Continued)

*Primary Examiner* — John B Sotomayor
*Assistant Examiner* — Matthew M Barker
(74) *Attorney, Agent, or Firm* — Donna P. Suchy; Daniel M. Barbieri

(57) ABSTRACT

A system and method for a terrain awareness warning system. The system includes a radar system configured to transmit a first radio frequency wave and receive a second radio frequency wave, a display for receiving a display signal representative of an obstacle source and an obstacle source data circuit. The obstacle source data circuit includes an interface and a display circuit. The interface is coupled to the radar system and the display. The display circuit is configured to determine the obstacle source based on the second radio frequency wave and to transmit the display signal representative of the obstacle source.

21 Claims, 9 Drawing Sheets

U.S. PATENT DOCUMENTS

| | | | |
|---|---|---|---|
| 6,246,367 B1 * | 6/2001 | Markson et al. | 342/460 |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,308,132 B1 * | 10/2001 | Wilson et al. | 701/200 |
| 6,311,108 B1 * | 10/2001 | Ammar et al. | 701/16 |
| 6,345,127 B1 | 2/2002 | Mitchell | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,424,288 B1 | 7/2002 | Woodell | |
| 6,426,717 B1 | 7/2002 | Maloratsky | |
| 6,430,480 B1 * | 8/2002 | Ammar et al. | 701/16 |
| 6,441,773 B1 | 8/2002 | Kelly et al. | |
| 6,448,922 B1 | 9/2002 | Kelly | |
| 6,452,511 B1 | 9/2002 | Kelly et al. | |
| 6,456,236 B1 | 9/2002 | Hauck et al. | |
| 6,473,240 B1 | 10/2002 | Dehmlow | |
| 6,483,454 B1 * | 11/2002 | Torre et al. | 342/30 |
| 6,492,934 B1 | 12/2002 | Hwang et al. | |
| 6,512,476 B1 | 1/2003 | Woodell | |
| 6,515,624 B1 | 2/2003 | Roesler et al. | |
| 6,525,674 B1 | 2/2003 | Kelly et al. | |
| 6,531,669 B1 | 3/2003 | Miller et al. | |
| 6,549,161 B1 | 4/2003 | Woodell | |
| 6,567,728 B1 | 5/2003 | Kelly et al. | |
| 6,574,030 B1 | 6/2003 | Mosier | |
| 6,577,947 B1 | 6/2003 | Kronfeld et al. | |
| 6,590,528 B1 | 7/2003 | DeWulf | |
| 6,591,171 B1 * | 7/2003 | Ammar et al. | 701/16 |
| 6,603,425 B1 | 8/2003 | Woodell | |
| 6,650,275 B1 | 11/2003 | Kelly et al. | |
| 6,683,556 B2 * | 1/2004 | Block | 342/65 |
| 6,690,298 B1 | 2/2004 | Barber et al. | |
| 6,690,299 B1 | 2/2004 | Suiter | |
| 6,690,317 B2 * | 2/2004 | Szeto et al. | 342/26 R |
| 6,714,186 B1 | 3/2004 | Mosier et al. | |
| 6,738,011 B1 * | 5/2004 | Evans | 342/26 C |
| 6,741,203 B1 | 5/2004 | Woodell | |
| 6,741,208 B1 | 5/2004 | West et al. | |
| 6,744,382 B1 | 6/2004 | Lapis et al. | |
| 6,744,408 B1 | 6/2004 | Stockmaster | |
| 6,757,624 B1 | 6/2004 | Hwang et al. | |
| 6,771,626 B1 | 8/2004 | Golubiewski et al. | |
| 6,804,614 B1 | 10/2004 | McGraw et al. | |
| 6,806,846 B1 | 10/2004 | West | |
| 6,819,983 B1 | 11/2004 | McGraw | |
| 6,822,617 B1 | 11/2004 | Mather et al. | |
| 6,839,017 B1 | 1/2005 | Dillman | |
| 6,850,185 B1 | 2/2005 | Woodell | |
| 6,856,908 B2 * | 2/2005 | Devarasetty et al. | 702/3 |
| 6,879,280 B1 | 4/2005 | Bull et al. | |
| 6,882,302 B1 | 4/2005 | Woodell et al. | |
| 6,918,134 B1 | 7/2005 | Sherlock et al. | |
| 6,950,062 B1 | 9/2005 | Mather et al. | |
| 6,961,445 B1 | 11/2005 | Jensen et al. | |
| 6,972,727 B1 | 12/2005 | West et al. | |
| 6,977,608 B1 | 12/2005 | Anderson et al. | |
| 6,995,726 B1 | 2/2006 | West et al. | |
| 6,998,908 B1 | 2/2006 | Sternowski | |
| 6,999,022 B1 | 2/2006 | Vesel et al. | |
| 7,002,546 B1 | 2/2006 | Stuppi et al. | |
| 7,034,753 B1 | 4/2006 | Elsallal et al. | |
| 7,089,092 B1 | 8/2006 | Wood et al. | |
| 7,092,645 B1 | 8/2006 | Sternowski | |
| 7,098,809 B2 * | 8/2006 | Feyereisen et al. | 340/963 |
| 7,109,912 B1 | 9/2006 | Paramore et al. | |
| 7,109,913 B1 | 9/2006 | Paramore et al. | |
| 7,129,885 B1 | 10/2006 | Woodell et al. | |
| 7,148,816 B1 | 12/2006 | Carrico | |
| 7,151,507 B1 | 12/2006 | Herting | |
| 7,158,072 B1 | 1/2007 | Venkatachalam et al. | |
| 7,161,525 B1 | 1/2007 | Finley et al. | |
| 7,170,446 B1 | 1/2007 | West et al. | |
| 7,196,329 B1 | 3/2007 | Wood et al. | |
| 7,205,933 B1 | 4/2007 | Snodgrass | |
| 7,219,011 B1 | 5/2007 | Barber | |
| 7,242,343 B1 | 7/2007 | Woodell | |
| 7,272,472 B1 | 9/2007 | McElreath | |
| 7,292,178 B1 | 11/2007 | Woodell et al. | |
| 7,479,920 B2 * | 1/2009 | Niv | 342/65 |
| 7,515,087 B1 * | 4/2009 | Woodell et al. | 342/26 B |
| 7,609,200 B1 * | 10/2009 | Woodell et al. | 342/176 |
| 7,672,783 B2 * | 3/2010 | Oettinger | 702/4 |
| 2003/0132876 A1 * | 7/2003 | Block | 342/65 |
| 2004/0178943 A1 * | 9/2004 | Niv | 342/29 |
| 2006/0238402 A1 * | 10/2006 | Khatwa | 342/29 |
| 2007/0171094 A1 * | 7/2007 | Alter et al. | 340/970 |

OTHER PUBLICATIONS

"Technical Standard Order," TSO-C115b, Airborne Area Navigation Equipment Using Multi-Sensor Inputs, Sep. 30, 1994, 11 pages, Department of Transportation, Federal Aviation Administration, Washington, DC.

* cited by examiner ns # US 8,232,910 B1

RTAWS ACTIVE TOWER HAZARD DETECTION SYSTEM

BACKGROUND

The present disclosure relates generally to the field of aviation. Specifically, the present disclosure relates to a radar terrain awareness warning system ("RTAWS").

Radar terrain awareness warning system provides aircrews with information regarding the terrain. One elemental piece of terrain information that is needed by aircrews are tower installation locations. This is a difficult piece of terrain information to provide because tower installations are growing at a rapid rate and passive databases are incomplete.

What is needed is a radar terrain awareness warning system configured to actively provide tower installation locations to allow the aircrew to more effectively determine the appropriate course of action during an aircraft flight.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to an aircraft system including a radar system configured to transmit a first radio frequency wave and receive a second radio frequency wave, a display for receiving a display signal representative of an obstacle source and an obstacle source data circuit. The obstacle source data circuit includes an interface coupled to the radar system and the display. The display circuit is configured to determine the obstacle source based on the second radio frequency wave and to transmit the display signal representative of the obstacle source.

Another embodiment of the disclosure relates to a method for providing a terrain awareness warning system including transmitting a first radio frequency wave and receiving a second radio frequency wave. The method further includes determining a source of the second radio frequency wave and determining a location of the source. The method also includes generating an airplane to source comparison based on comparing the location with a flight path parameter.

Another embodiment of the disclosure relates to a terrain awareness warning system, which includes a means for transmitting a first radio frequency wave and a means for receiving a second radio frequency wave. The terrain awareness warning system also includes a means for determining a source of the second radio frequency wave and a means for determining a location of the source. The terrain awareness warning system further includes a means for generating an airplane to source comparison based on comparing the location with a flight path parameter.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
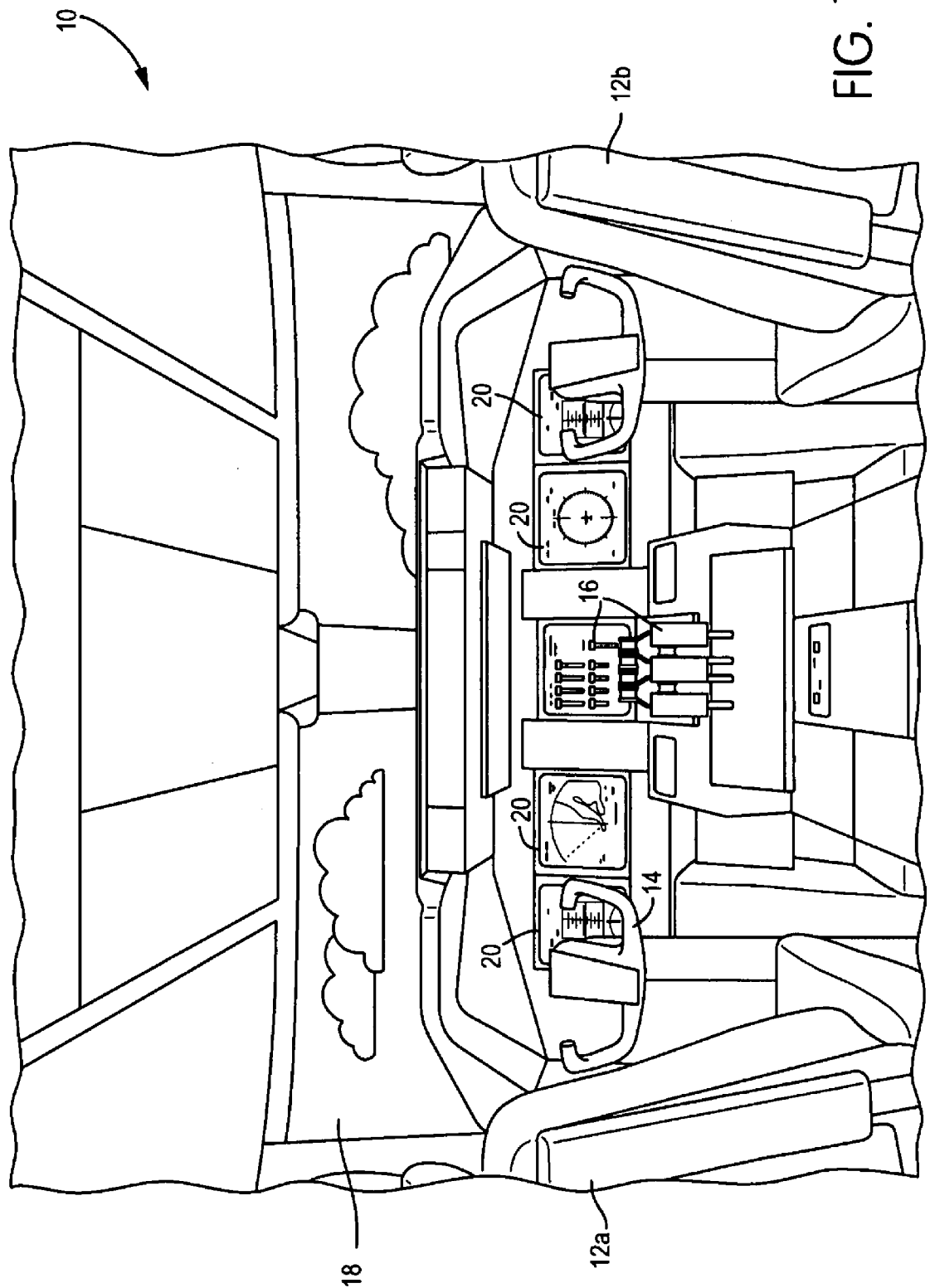
FIG. 1 is an illustration of an aircraft control center, according to one exemplary embodiment.

Referring to FIG. 1, an illustration of an aircraft control center 10 is shown, according to one exemplary embodiment. Aircraft control center 10 may include a pilot seat 12a, a co-pilot seat 12b, an aircraft control stick 14, a plurality of flight controls 16 and flight displays 20. The pilot sitting in pilot seat 12a may utilize aircraft control stick 14 to maneuver airplane 100. The pilot may initiate airplane 100 maneuvers including moving airplane 100 in an upwardly motion, downwardly motion, banking to the left, banking to the right or any combination thereof. The pilot can visually monitor the flight path thorough windshield 18. However, when the pilot utilizes windshield 18, his visual range is limited.

The crew utilizes flight displays 20 to increase their visual range and to enhance their decision-making abilities. In an exemplary embodiment, flight displays 20 may be configured to show weather, terrain, fixed obstacles, variable obstacles (i.e., other airplanes), flight characteristics (i.e., altitude or speed), or any combination thereof.

Figure 2A:
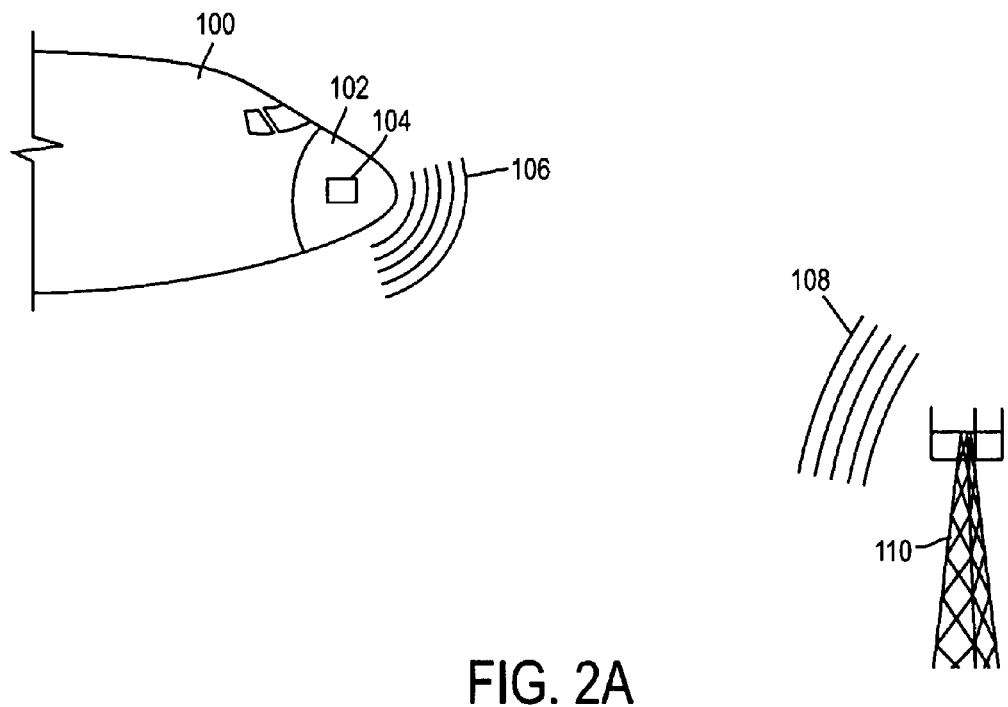
FIG. 2A is an illustration of an aircraft cone section, which includes the radar terrain awareness warning system, according to an exemplary embodiment.

In FIG. 2A, an illustration of an aircraft cone section 102, which includes a terrain awareness warning system 104 is shown, according to an exemplary embodiment. In an exemplary embodiment, terrain awareness warning system 104 utilizes a broad band directional receiver and an active radar for detection of an obstacle source or tower 110. In an exemplary embodiment, tower 110 includes radio, television, cell phone or any other similar structure. In another exemplary embodiment, terrain awareness warning system 104 is configured to detect a plurality of towers 112 (see FIG. 7). It should be noted that the obstacle source can be any source detectable by terrain awareness warning system 104.

In an exemplary embodiment, terrain awareness warning system 104 is configured to transmit a first radio frequency wave 106 in a predetermined pattern. First radio frequency wave 106 reflects off of tower 110 to become a second radio frequency wave 108. Second radio frequency wave 108 is detected by terrain awareness warning system 104. In an exemplary embodiment, terrain awareness warning system 104 includes a RTAWS processor 502 (see FIG. 3) that determines whether second radio frequency wave 108 relates to tower 110.

Figure 2B:
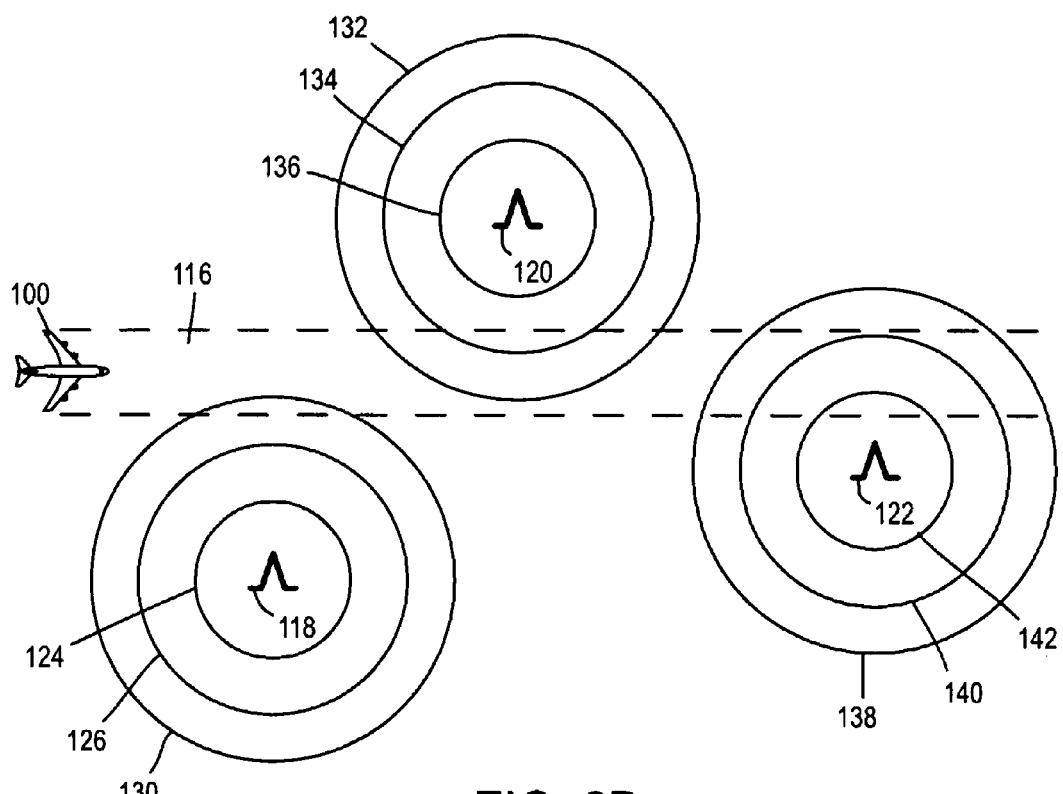
FIG. 2B is an illustration of an airplane traveling on a flight path that will be in proximity to a first tower, a second tower and a third tower, according to an exemplary embodiment.

In FIG. 2B, an illustration of airplane 100 traveling on a flight path 116 that will be in proximity to a first tower 118, a second tower 120 and a third tower 122 is shown, according to an exemplary embodiment. In an exemplary embodiment, first tower 118 has a first warning envelope 124, a first caution envelope 126, and a first advisory envelope 130 which surround first tower 118. In this exemplary embodiment, flight path 116 will intersect with first advisory envelope 130. In this exemplary embodiment, terrain awareness warning system 104 may be configured to transmit an advisory signal and/or message.

In an exemplary embodiment, second tower 120 has a second warning envelope 132, a second caution envelope 134, and a second advisory envelope 136 which surround second tower 120. In this exemplary embodiment, flight path 116 will intersect with second advisory envelope 136 and second caution envelope 134. In this exemplary embodiment, terrain awareness warning system 104 may be configured to transmit an advisory signal and/or caution signal.

In an exemplary embodiment, third tower 122 has a third warning envelope 138, a third caution envelope 140, and a third advisory envelope 142 which surround third tower 122. In this exemplary embodiment, flight path 116 will intersect with third advisory envelope 142, third caution envelope 140 and third warning envelope 138. In this exemplary embodiment, terrain awareness system 104 may be configured to transmit a warning signal and/or message. In another exemplary embodiment, terrain awareness system 104 may be configured to transmit an advisory signal based on the distance airplane 100 is away from third tower 122. In this exemplary embodiment, terrain awareness system 104 may be configured to transmit a caution signal as airplane 100 travels closer to third tower 122. In this exemplary embodiment, terrain awareness system 104 may be configured to transmit a warning signal as airplane 100 continues to approach third tower 122.

It should be noted that the warning envelopes, caution envelopes and advisory envelopes may form a regular shape (i.e., circle, triangle, ellipse, square or rectangle) or any irregular shape.

Figure 3:
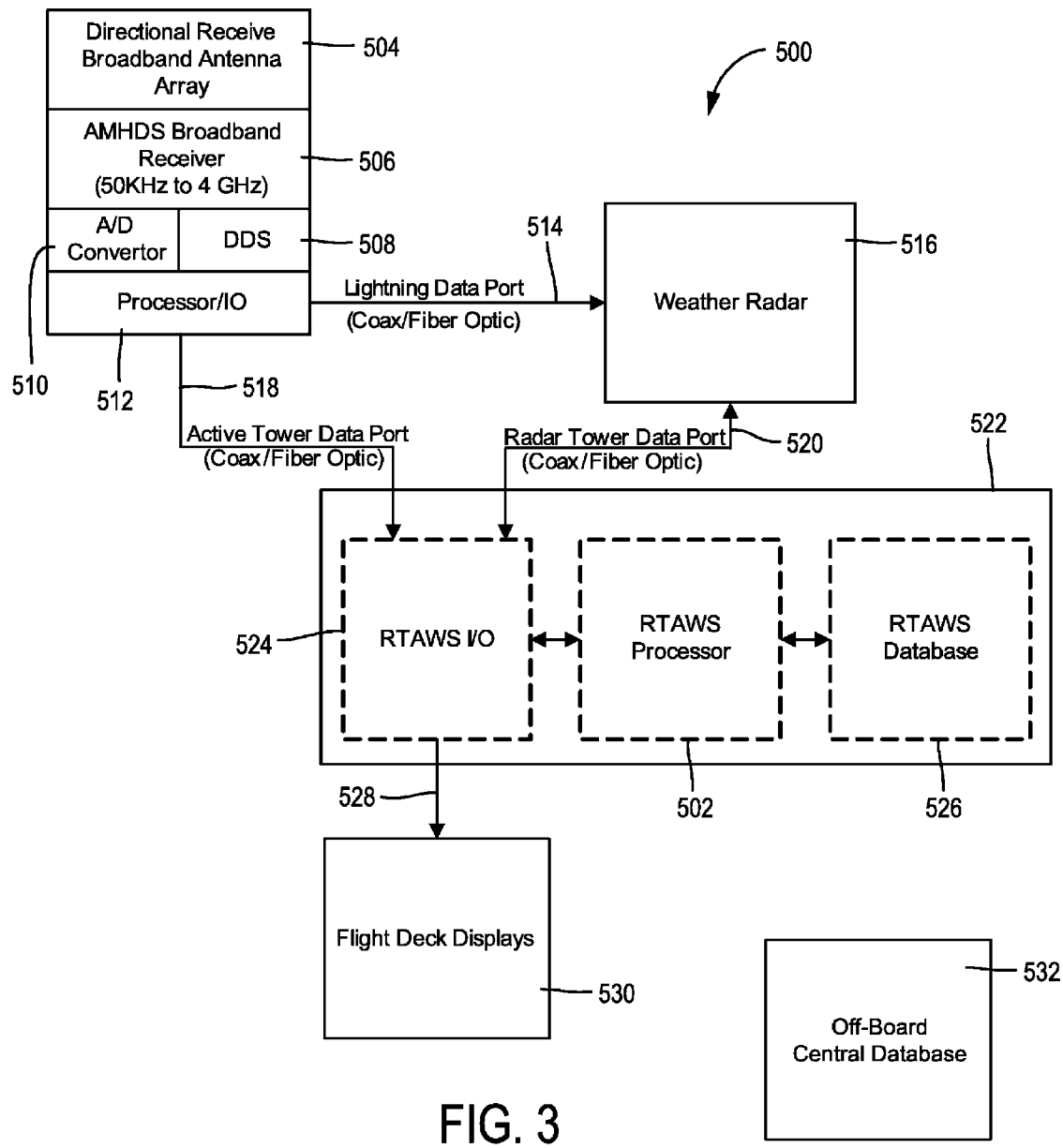
FIG. 3 is a block diagram of the system; according to an exemplary embodiment.

In FIG. 3, a block diagram 500 of terrain awareness warning system 104 is shown, according to an exemplary embodiment. In an exemplary embodiment, terrain awareness warning system 104 may include a radar terrain awareness warning system 522. Radar terrain awareness warning system 522 may include a RTAWS input/output 524, RTAWS processor 502 and a RTAWS database 526. Terrain awareness warning system 104 may also include a directional receiver broadband antenna array 504, an AMHDS broadband receiver 506, an analog to digital converter 510, a direct digital sensor 508, an input/output processor 512, a weather radar 516, and a flight deck display 530.

In an exemplary embodiment, input/output processor 512 communicates a lightning data over a first communication link 514 to weather radar 516. In another exemplary embodiment, input/output processor 512 communicates an active tower data over a second communication link 518 to RTAWS input/output 524. RTAWS input/output 524 communicates radar tower data over a third communication link 520 to weather radar 516. In another exemplary embodiment, RTAWS input/output 524 may be configured to communicate tower data, advisory signals, caution signal and/or warning signals over a fourth communication link 528 to flight deck display 530. With reference to FIG. 3, an obstacle source data circuit may be configured to transmit an obstacle source characteristic signal to an off-board central database 532. Further, off-board central database 532 may be configured to transmit a plurality of obstacle source characteristic signals to the on-board obstacle source database (e.g., RTAWS database 526).

Figure 4:
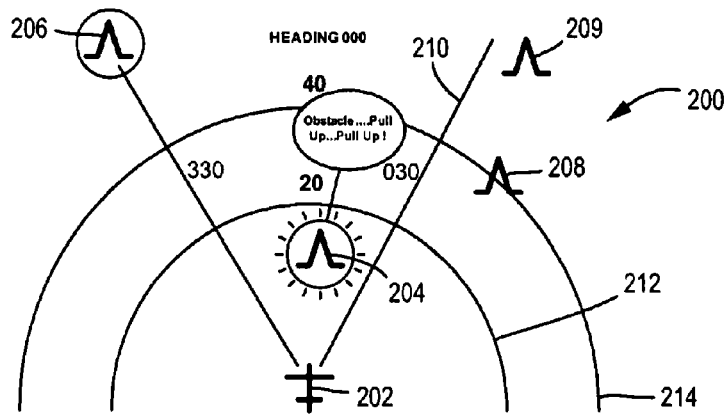
FIG. 4 is an illustration of a horizontal tower obstacle view, according to an exemplary embodiment.

In FIG. 4, an illustration of a horizontal tower obstacle view 200 is shown, according to an exemplary embodiment. Airplane image 202 represents the position of airplane 100. In an exemplary embodiment, a radio frequency envelope 210 depicts the area that terrain awareness warning system 104 is transmitting radio frequency signals into. In this exemplary embodiment, radio frequency envelope 210 has been utilized to identify a first warning tower 204 and a second warning tower 206. In this exemplary embodiment, a caution tower 209 and an advisory tower 208 are also shown.

In an exemplary embodiment, airplane 100 or airplane image 202 is surrounded by a first terrain avoidance distance area 212 and a second terrain avoidance distance area 214. In this exemplary embodiment, first warning tower 204 is located in radio frequency envelope 210 and first terrain avoidance distance area 212. In this exemplary embodiment, second warning tower 206 is located in radio frequency envelope 210 and second terrain avoidance distance area 214.

In an exemplary embodiment, terrain awareness warning system 104 is configured to initiate a warning signal for first warning tower 204 because first warning tower 204 is located in both radio frequency envelope 210 and first terrain avoidance distance area 212. In this exemplary embodiment, terrain awareness warning system 104 may be configured to initiate a caution signal for second warning tower 206 because second warning tower 206 is located in radio frequency envelope 210 but not in first terrain avoidance distance area 212. If second warning tower 206 would enter first terrain avoidance distance area 212 while still being in radio frequency envelope 210, then terrain awareness warning system 104 may be configured to initiate a warning signal. It should be noted that a person skilled in the art could develop multiple variations on these criteria.

In an exemplary embodiment, caution tower 209 is designated with a caution status because caution tower 209 is in close proximity to radio frequency envelope 210. In this exemplary embodiment, advisory tower 208 is designated with an advisory status because advisory tower 208 is within second terrain avoidance distance area 214 but not in close proximity to radio frequency envelope 210.

Figure 5:
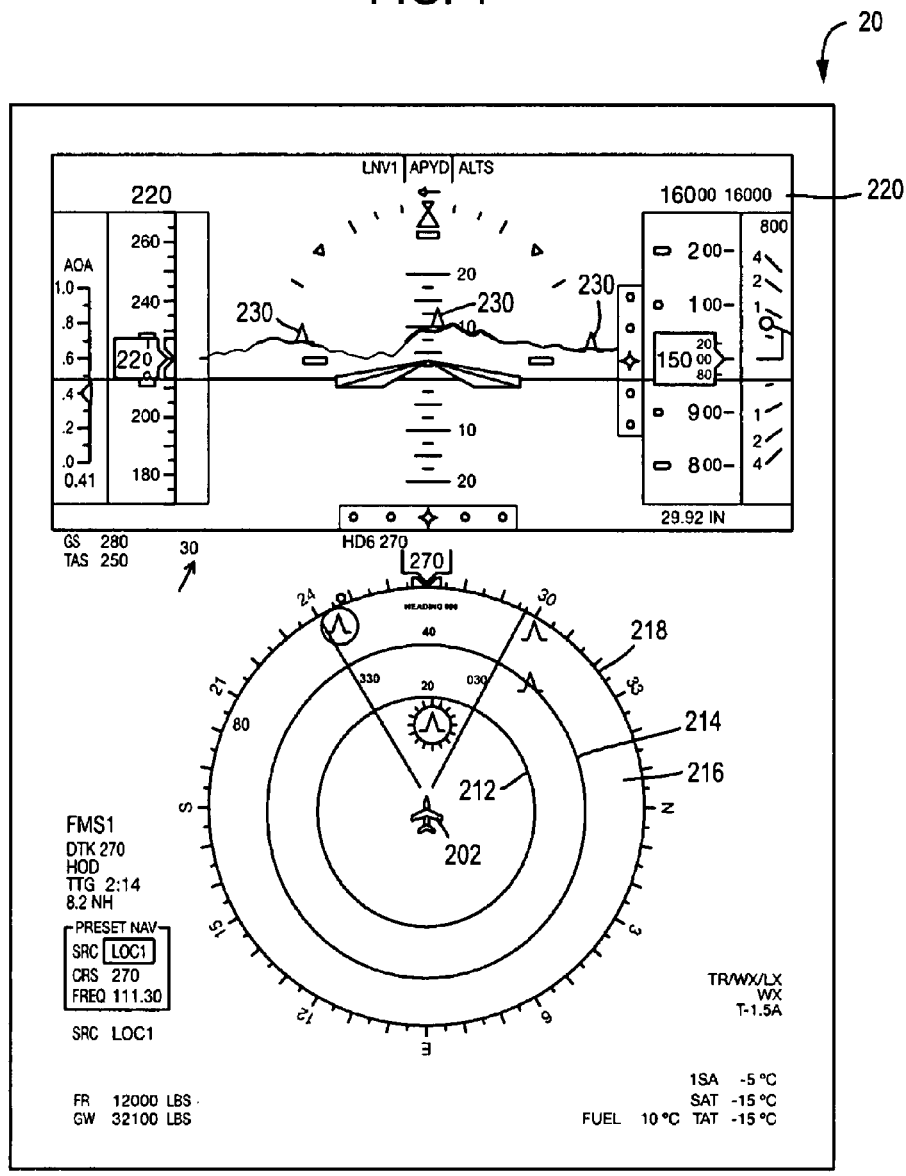
FIG. 5 is an illustration of a display incorporating a horizontal tower obstacle view and a synthetic vision system view, according to an exemplary embodiment.

In FIG. 5, a horizontal display 20 incorporating a horizontal tower obstacle view 216 and a synthetic vision system view 220 is shown, according to an exemplary embodiment. Horizontal tower obstacle view 216 includes airplane image 202, first terrain avoidance distance 212, second terrain avoidance distance 214, third terrain avoidance distance 216, first warning tower 204, second warning tower 206, caution tower 209 and advisory tower 208. Synthetic vision system view 220 includes mountains and a plurality of towers 230.

Figure 6A:
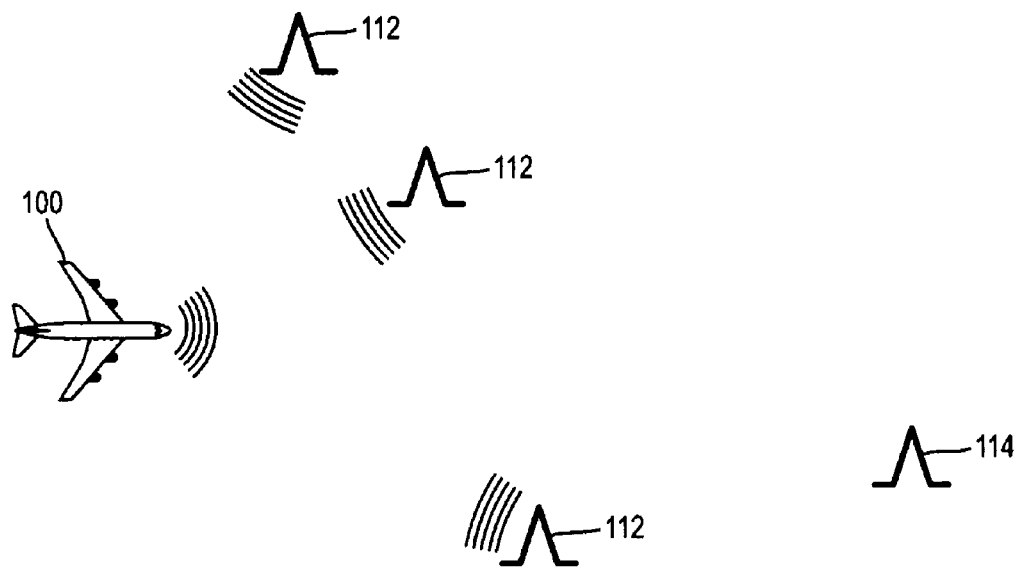
FIGS. 6A-6B are illustrations of an airplane approaching a plurality of towers, according to an exemplary embodiment.
Figure 6B:
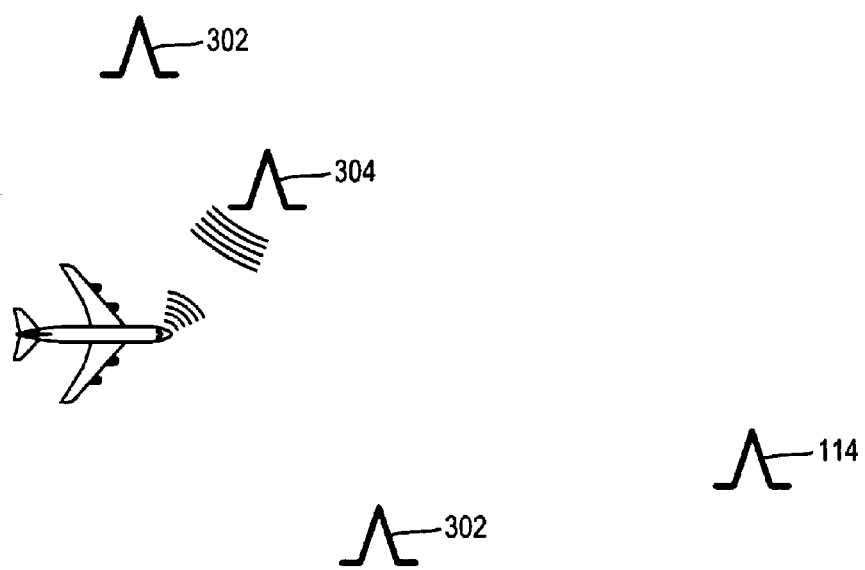

In FIGS. 6A and 6B, illustrations of airplane 100 approaching a first set of towers 112 and an out-of-range tower 114 are shown, according to exemplary embodiments. In FIG. 6A, airplane 100 transmits first radio frequency wave 106 which contacts first set of towers 112. First set of towers 112 redirects first radio frequency wave 106 to create second radio frequency waves 108. Second radio frequency waves 108 are received by terrain awareness warning system 104. In an exemplary embodiment, terrain awareness warning system 104 is configured to have predetermined tower selection criteria. The predetermined tower selection criteria may include tower height, airplane height, flight path 116, airplane speed, airplane maneuvering characteristics (i.e., turning radius, turning speed or acceleration), tower grouping, known tower status or unknown tower status.

In FIG. 6B, airplane 100 has moved closer to first set of towers 112 (see FIG. 6A). In an exemplary embodiment, terrain awareness warning system 104 has determined that two of the towers are outside the predetermined tower selection criteria. In an exemplary embodiment, these non-selected towers 302 may not require that a signal be sent from terrain awareness warning system 104. In this exemplary embodiment, terrain awareness warning system 104 has determined that one of first set of towers 112 is a selected tower 304. Terrain awareness warning system 104 may be configured to actively target this selected tower 304 to obtain enhanced data regarding selected tower's 304 position and height.

In an exemplary embodiment, terrain awareness warning system 104 utilizes three systems interactively of which two are active sensors. These systems are a passive terrain/obstacle database, an active directional radio frequency emission detection and an active X-band weather radar detection. In an exemplary embodiment, the active directional radio frequency emission detection may have a detection range of 200 miles. In other exemplary embodiments, the active directional radio frequency emission detection may have a detection range of 50, 80, 100, 150, 180 or 200 miles. In an exemplary embodiment, the active X-band weather radar detection is utilized for close range detection and hazard verification. In another exemplary embodiment, the direction and range of lightning may also be incorporated into the system because the frequency range of the radio receiver covers the radio frequency emission band of lightning.

Figure 7:
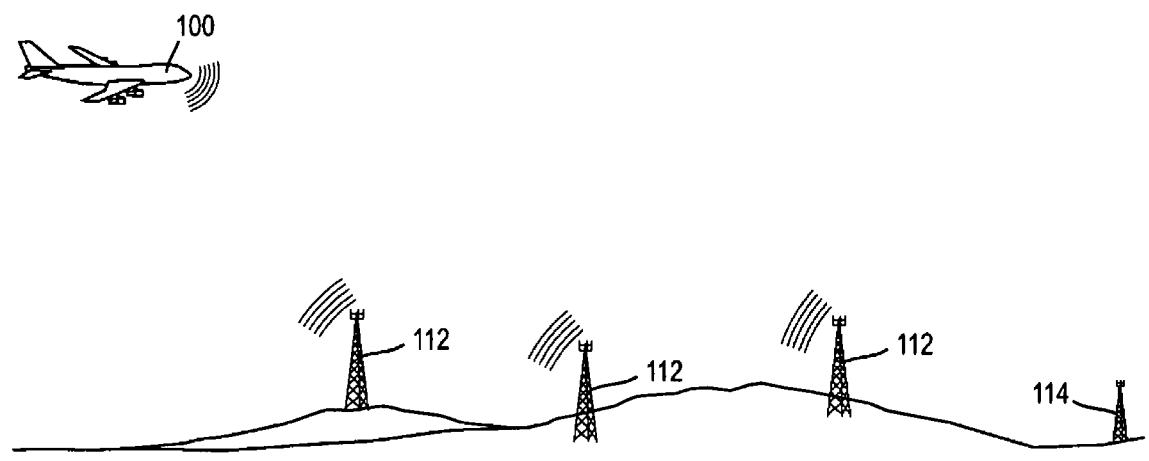
FIG. 7 is another illustration of an airplane approaching a plurality of towers, according to an exemplary embodiment.

In FIG. 7, another illustration of airplane 100 approaching first set of towers 112 and an out-of-range tower 114 is shown, according to an exemplary embodiment. Airplane 100 transmits first radio frequency wave 106 which contacts first set of towers 112. First set of towers 112 redirects first radio frequency wave 106 to create second radio frequency waves 108. Second radio frequency waves 108 are received by terrain awareness warning system 104.

Figure 8A:
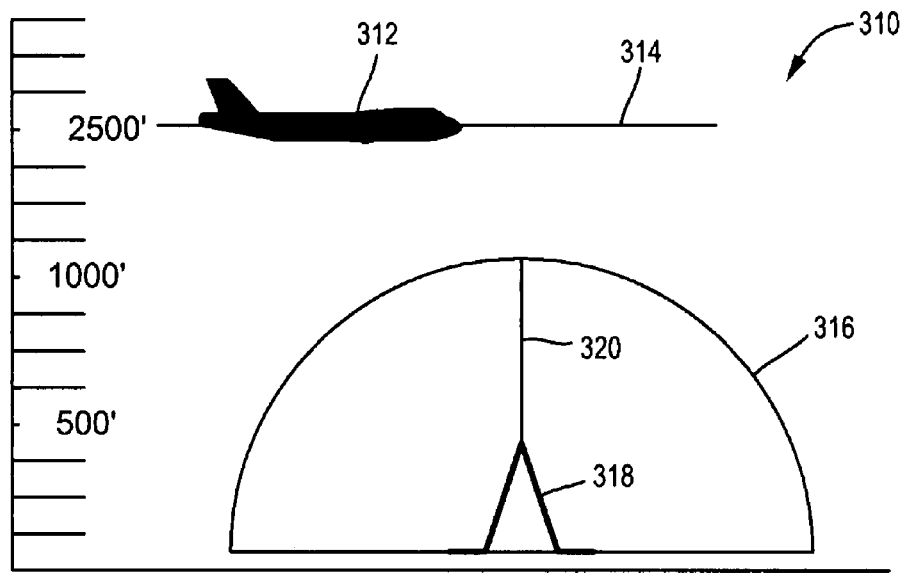
FIG. 8A is an illustration of a vertical view of the airplane and the tower, according to an exemplary embodiment.

In FIG. 8A, an illustration of a vertical view 310 of an airplane image 312 and a tower image 318, according to an exemplary embodiment. In an exemplary embodiment, vertical view 310 may include airplane image 312, an airplane height line 314, tower image 318, a clearance distance 320 and a clearance envelope 316. In an exemplary embodiment, clearance distance 320 and clearance envelope 316 may be predetermined based on terrain characteristics (i.e., hills, mountains, city, near airport, lake and/or ocean), tower congestion, known tower status, unknown tower status, and/or airplane characteristics.

Figure 8B:
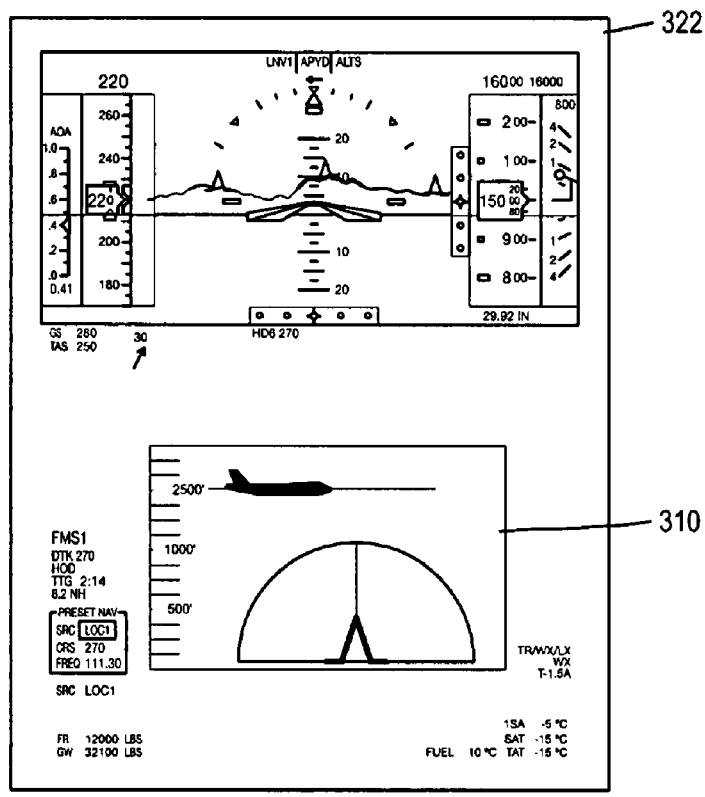
FIG. 8B is an illustration of the vertical view in FIG. 8A incorporated into a display, according to an exemplary embodiment.

In FIG. 8B, an illustration of vertical view 310 in FIG. 8A is incorporated into a display 322, according to an exemplary embodiment.

Figure 9:
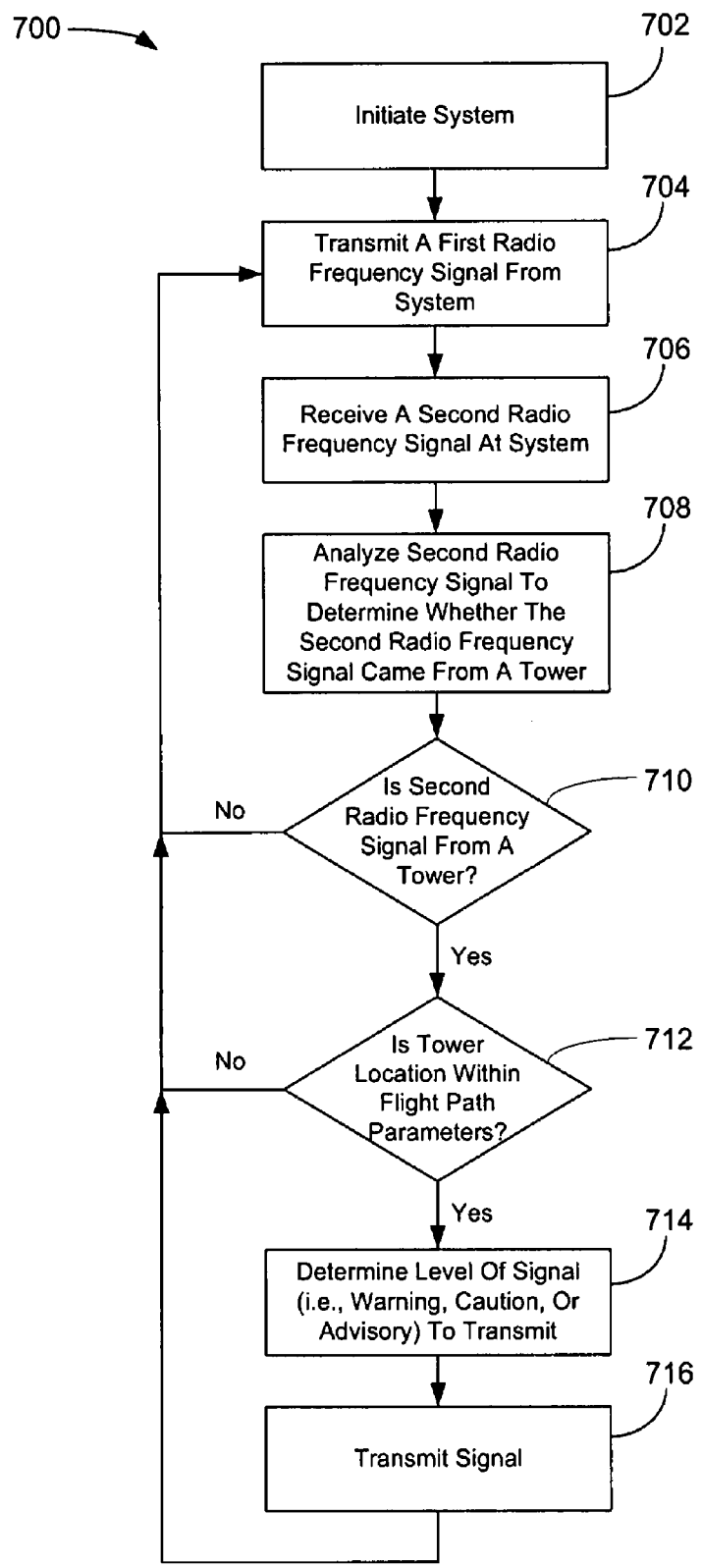
FIG. 9 is a flowchart of an operating procedure of the system, according to an exemplary embodiment.

In FIG. 9, a flowchart 700 of an operating procedure of the system is shown, according to an exemplary embodiment. Terrain awareness warning system 104 is initiated (step 702). Terrain awareness warning system 104 transmits first radio frequency wave 106 (step 704). Terrain awareness warning system 104 receives second radio frequency wave 108 (step 706). Terrain awareness warning system 104 analyzes second radio frequency wave 108 to determine whether second radio frequency wave 108 originated from tower 110 (step 708). If second radio frequency wave 108 is not from tower 110, then terrain awareness warning system 104 returns to step 704 (step 710). If second radio frequency wave 108 is from tower 110, then terrain awareness warning system 104 moves to step 712 (step 710). Terrain awareness warning system 104 determines whether tower 110 is located within flight path parameters. If tower 110 is not located within flight path parameters, then terrain awareness warning system 104 returns to step 704 (step 712). If tower 110 is located within flight path parameters, then terrain awareness warning system 104 moves to step 714 (step 712). Terrain awareness warning system 104 determines whether to issue a warning signal, a caution signal and/or an advisory signal (step 714). Terrain awareness warning system 104 transmits at least one signal determined in step 714 and returns to step 704 (step 716).

Figure 10A:
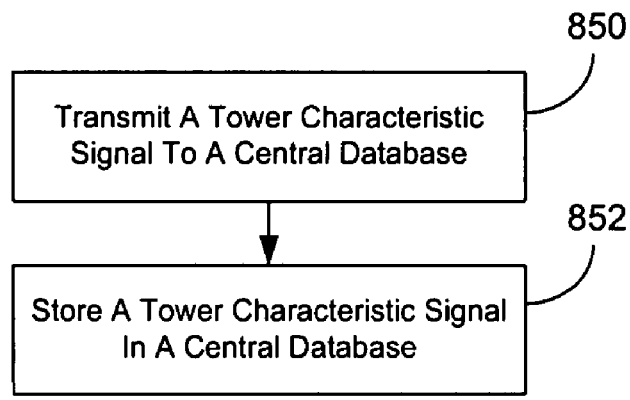
FIGS. 10A and 10B are flowcharts of other operating procedures of the system, according to exemplary embodiments.

In FIG. 10A, a flowchart of another operating procedure of the system is shown, according to an exemplary embodiment. The system transmits a tower characteristics signal to a central database (step 850). The central database stores the tower characteristics signal (step 852). It should be noted that a plurality of tower characteristics signals may be transmitted to the central database.

Figure 10B:
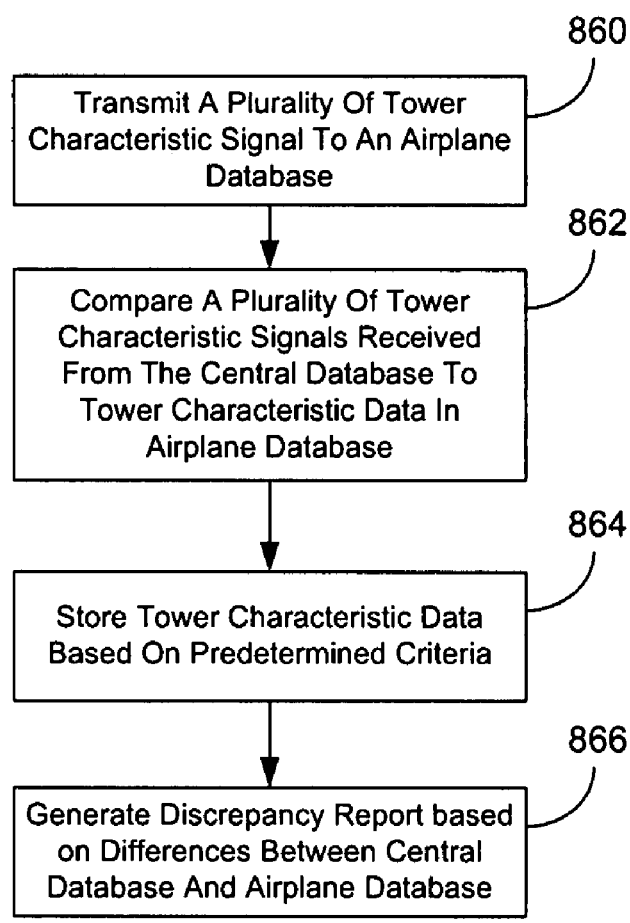

In FIG. 10B, another process flowchart for the system is shown, according to an exemplary embodiment. The central database transmits a plurality of tower characteristic signals to an airplane database (step 860). An airplane processor compares the plurality of tower characteristic signals received from the central database to tower characteristic data already stored in the airplane's database (step 862). The airplane processor stores the plurality of tower characteristic signals based on a predetermined set of criteria (step 864). In an exemplary embodiment, the system analyzes discrepancies between the plurality of tower characteristic signals and the tower characteristic signals already stored in the airplane's database to determine which value should be stored in the airplane's database. The system generates a report of the discrepancies between the plurality of tower characteristic signals and the tower characteristic signals already stored in the airplane's database (step 866).

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the terrain awareness warning system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. In an aircraft, including a weather radar system and a directional radio frequency receiver system and a display, and obstacle detection system for coupling to the display comprising:
   an interface for coupling to the radar system; and
   a processor configured to determine a presence of a radio, television, or cell phone tower based on information received from the directional receiver, and the processor configured to cause the display to provide a representation of the tower, wherein the processor is configured to provide a warning of a presence of the tower in response to the tower being within an envelope of the weather radar system and being within a first distance from the aircraft, wherein the directional receiver is a broadband receiver.

2. The system of claim 1, wherein the processor is configured to determine at least one of an advisory and a caution based on the tower being within a second distance of the aircraft, the another second distance being greater than the first distance.

3. The system of claim 2, further comprising a flight deck display and wherein the system transmits a signal to the flight deck display based on the at least one of the advisory and the caution and the warning.

4. The system of claim 1, wherein the broadband receiver is configured to provide lightning detection data.

5. The system of claim 4, wherein the lighting detection data includes range and direction data.

6. The system of claim 1, further comprising:
   a flight deck display;
   the system being configured to determine at least one of an advisory and a caution based on the obstacle source; and
   wherein the system is configured to transmit a signal to the flight deck display based on the at least one of the advisory the caution and the warning.

7. The system of claim 1, wherein the system is configured to transmit an obstacle source characteristic signal to an off-board central database.

8. The system of claim 1, wherein an off-board central database is configured to transmit a plurality of obstacle source characteristic signals to an on-board obstacle source database.

9. The system of claim 8, wherein the processor is configured to compare the plurality of obstacle source characteristic signals to an obstacle source characteristic data stored in the on-board obstacle source database and wherein the processor is configured to generate a discrepancy report.

10. A terrain awareness warning system for use on-board an aircraft, comprising:
- means for receiving a reflected radio frequency wave associated with a target, the target being at least partially reflective, the target including a radio, cell phone, or television tower providing an active emission;
- means for receiving the active emission from the tower to detect the tower;
- means for determining a location of the tower based upon information from the means for receiving a reflected radio frequency wave; and
- means for generating a warning based upon selection criteria.

11. The terrain awareness warning system of claim 10, wherein the selection criteria includes an airplane height.

12. The terrain awareness warning system of claim 10, wherein the means for receiving an active emission is configured to detect a lightning strike.

13. The terrain awareness warning system of claim 10, further comprising a means for transmitting target characteristics to an off-board database.

14. The terrain awareness warning system of claim 10, further comprising a means for receiving a plurality of target characteristics from an off-board database.

15. The terrain awareness warning system of claim 14, further comprising a means for comparing the plurality of target signals to a target characteristic database in a terrain awareness warning system.

16. A terrain awareness warning system comprising:
- a processor coupled to an obstacle data base for passively determining the presence of an obstacle, the obstacle including a radio, television, or cell phone tower, the radio, television or cell phone tower providing radio frequency emissions;
- a directional broadband receiver configured to detect the presence of the tower from the radio frequency emissions from the tower and coupled to the processor; and
- an active radar system configured to determine the presence of the tower based upon the reception of reflected radar signals, wherein the processor is configured to provide a warning signal in response to a distance to the tower and the tower being in an envelope of the active radar system.

17. The terrain awareness warning system of claim 16 wherein the directional broadband receiver is configured to provide lightning detection data to the active radar system.

18. The terrain awareness warning system of claim 16, wherein the active radar system is an x-band weather radar system.

19. The terrain awareness warning system of claim 16 wherein the receiver has a detection range of more than 50 miles.

20. The terrain awareness warning system of claim 16, wherein the active radar system is an x-band system and the receiver has a 50 KHz to 4 GHz bandwidth.

21. The terrain awareness warning system of claim 16, wherein the tower is selected for enhanced data collection by the active radar system.

\* \* \* \* \*